United States Patent
Mizuno et al.

(10) Patent No.: US 12,524,981 B2
(45) Date of Patent: Jan. 13, 2026

(54) IMAGE PROCESSING DEVICE WITH IMAGE ADJUSTMENT BASED ON DISPLAY PERFORMANCE INFORMATION

(71) Applicant: CASIO COMPUTER CO., LTD., Tokyo (JP)

(72) Inventors: Kimiyasu Mizuno, Akishima (JP); Keiichi Sakurai, Akishima (JP); Koki Nakamura, Sakado (JP); Hideo Suzuki, Ome (JP); Karen Suzuki, Musashino (JP); Bing Yu, Koganei (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 350 days.

(21) Appl. No.: 18/189,765

(22) Filed: Mar. 24, 2023

(65) Prior Publication Data
US 2023/0326171 A1    Oct. 12, 2023

(30) Foreign Application Priority Data
Mar. 25, 2022    (JP) .................................. 2022-049871

(51) Int. Cl.
G06K 9/00        (2022.01)
G06V 10/20       (2022.01)
G06V 10/26       (2022.01)

(52) U.S. Cl.
CPC .......... G06V 10/267 (2022.01); G06V 10/255 (2022.01)

(58) Field of Classification Search
CPC .... G06V 10/267; G06V 10/255; G06V 20/52; G06V 10/25–273; G06V 20/49;
(Continued)

(56) References Cited

U.S. PATENT DOCUMENTS

| | | | |
|---|---|---|---|
| 6,452,665 B1* | 9/2002 | Kikuchi | G01S 17/931 342/91 |
| 2015/0199590 A1* | 7/2015 | Yaguchi | G06F 18/22 382/195 |

(Continued)

FOREIGN PATENT DOCUMENTS

| | | |
|---|---|---|
| JP | 2003199097 A | 7/2003 |
| JP | 2004078837 A | 3/2004 |

(Continued)

OTHER PUBLICATIONS

Japanese Notice of Reasons for Refusal, dated Mar. 5, 2024, for Japanese Patent Application No. 2022-049871. (15 pages) (with English translation).

(Continued)

*Primary Examiner* — Atiba O Fitzpatrick
(74) *Attorney, Agent, or Firm* — Seed Intellectual Property Law Group LLP

(57) ABSTRACT

An image processing device includes a data transmitter/receiver and at least one processor. The processor obtains first data of a continuous first image, obtains performance information of a display of a first external device that displays a second image based on the first image, generates, from the first data, second data of the second image in accordance with the performance information, and outputs the second data to the first external device through the data transmitter/receiver.

12 Claims, 5 Drawing Sheets

(58) Field of Classification Search
CPC .... G06V 20/695; G06V 40/162; G06V 20/80; G06V 20/698; G06F 1/1613–1698; G06F 1/163; G09G 2340/00–16; G09G 2340/04–0492; G09G 2340/145; G09G 2340/0407; G09G 2340/0414; G09G 2340/0421; G09G 2340/0428; G09G 2340/0435; G06T 2207/20132; G06T 7/10–194; G06T 2207/20021; G06T 2207/20112–20168; A61B 5/7485; G06K 9/6224

See application file for complete search history.

(56) References Cited

U.S. PATENT DOCUMENTS

| | | | |
|---|---|---|---|
| 2017/0237986 A1* | 8/2017 | Choi | H04W 4/80 348/14.02 |
| 2019/0385266 A1* | 12/2019 | Mishra | G06F 3/065 |
| 2023/0036950 A1* | 2/2023 | Saa-Garriga | G09G 5/005 |
| 2024/0087081 A1* | 3/2024 | Xu | G06T 7/60 |
| 2024/0394891 A1* | 11/2024 | Sharma | G06V 40/161 |

FOREIGN PATENT DOCUMENTS

| | | |
|---|---|---|
| JP | 2004194026 A | 7/2004 |
| JP | 2010087582 A | 4/2010 |
| JP | 2012010222 A | 1/2012 |
| JP | 2016024751 A | 2/2016 |
| WO | WO 2021024456 A1 | 2/2021 |

OTHER PUBLICATIONS

Japanese Notice of Reasons for Refusal, dated Jun. 4, 2024, for Japanese Patent Application No. 2022-049871. (12 pages) (with English translation).

* cited by examiner

IMAGE PROCESSING DEVICE WITH IMAGE ADJUSTMENT BASED ON DISPLAY PERFORMANCE INFORMATION

REFERENCE TO RELATED APPLICATIONS

This application is based upon and claims the benefit of priority from Japanese Patent Application No. 2022-049871 filed on Mar. 25, 2022, the entire content of which is incorporated herein by reference.

TECHNICAL FIELD

The present disclosure relates to an image processing device, an image processing system, an image processing method, a storage medium and a display device.

DESCRIPTION OF RELATED ART

In recent years, moving images, such as distribution videos and monitoring/observation images, have been able to be watched and checked easily on external terminal devices, mobile terminals in particular, via networks. Sizes of displays and levels of performance, such as image processing capability, of terminals that users use and also network communication environments that the users (terminals) use are different from one another. Then, there is a case where a moving image distribution server can distribute a moving image(s) in multiple resolutions, and a user (terminal device) that enjoys the distribution service can request the moving image having an appropriate resolution.

However, the data amount (bit date) of a moving image, the number of frames and the resolution of which are fixed, could significantly change depending on the content. Also, a network communication environment that a user (terminal) uses could change due to external factors. In WO 2021/024456 A1, there is disclosed a technique for a proxy server that transmits distribution data of a moving image distribution server, which is capable of distributing a video(s) in multiple resolutions, to a terminal requesting the distribution data, the technique being a technique of estimating the resolution and the bit rate of a distribution image and adjusting the throughput or the like such that the terminal can request the distribution server to transmit data having an appropriate resolution.

Further, there are known services such as social networking service (SNS) in which private images are broadcast in real time or recorded to be able to be watched or shared by specific individuals.

SUMMARY OF THE INVENTION

According to an aspect of the present disclosure, there is provided an image processing device including:
a data transmitter/receiver; and
at least one processor that
obtains first data of a continuous first image,
obtains performance information of a display of a first external device that displays a second image based on the first image,
generates, from the first data, second data of the second image in accordance with the performance information, and
outputs the second data to the first external device through the data transmitter/receiver.

BRIEF DESCRIPTION OF DRAWINGS

The accompanying drawings, which are incorporated in and constitute a part of the specification, illustrate embodiments, and together with the general description given above and the detailed description of the embodiments given below, serve to explain the principles of the present disclosure, wherein.

DETAILED DESCRIPTION

Hereinafter, one or more embodiments of the present disclosure will be described with reference to the drawings.

Figure 1:
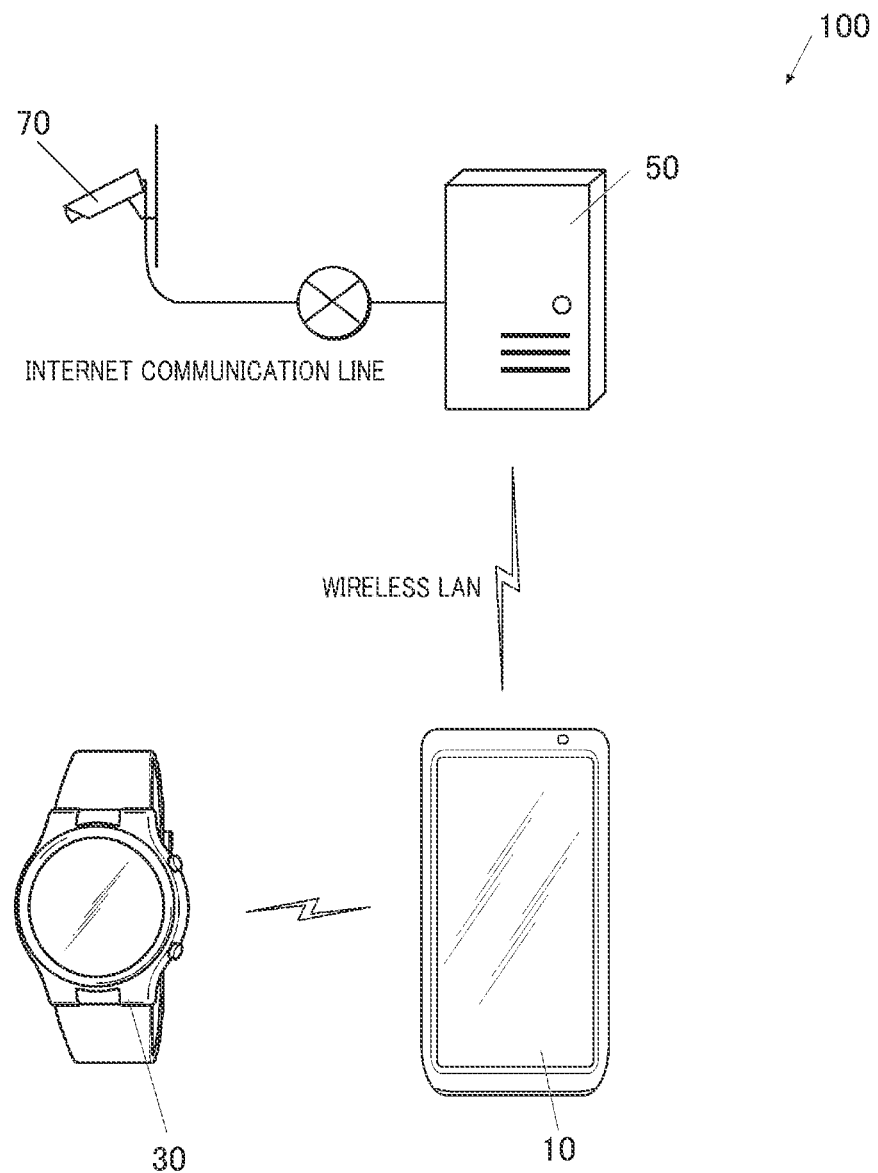
FIG. 1 is an overall view of a video display system of an embodiment(s)

FIG. 1 is an overall view of a video display system 100 of an embodiment(s).

The video display system 100, which includes an image processing system of this embodiment, includes an electronic device 10 as an image processing device of this embodiment, a terminal device 30 as a first external device or a display device of this embodiment, a server device 50 as a second external device of this embodiment, and an imaging device 70.

The electronic device 10 is not particularly limited to but a portable electronic device, such as a smartphone or a tablet terminal. The electronic device 10 has image data processing capability and display resolution sufficient to display standard distribution images. The electronic device 10 can transmit and receive (communicate) data to and from external devices (server device 50 and terminal device 30) via wireless communication, such as a wireless LAN.

In this embodiment, the terminal device 30 is a wearable terminal device; to be more specific, a terminal device worn on a wrist, such as a smartwatch. The terminal device 30 has a display screen, such as a small liquid crystal display (LCD). The display screen may be smaller than the width of a wrist, or larger than the width of a wrist but smaller than an LCD of the electronic device 10. In this embodiment, the display screen is about 1.4 inches or smaller, for example. The terminal device 30 performs measurement with a biometric sensor(s) (pulse/SpO2 sensor, etc.) and/or a physical sensor(s) (geomagnetic field sensor, acceleration sensor, air pressure sensor, temperature sensor, etc.) and performs a process to identify the movement/motion state of a user, environment around the user and/or the like on the basis of the measurement result(s), and also obtains predetermined information from an external device(s) and performs simple display of the information. Examples of the information include notifications of incoming phone calls, e-mails, SNS and so forth to the external device and notifications of arrival of schedules set on the external device. Performance of the terminal device 30 is often insufficient to process and display moving image data. In other words, the load thereof is heavy for the terminal device 30. In this embodiment, the terminal device 30 and the electronic device 10 are owned by the same user. However, other cases are not excluded from the present disclosure. For example, there may be a case where the electronic device 10 is owned by one user, the terminal device 30 is owned by another user who belongs to the same group as the one user, and the terminal device 30 is communicatively connected to the electronic device 10.

The server device 50 is a distribution server of image data of images including moving images. The server device 50 obtains image data from the imaging device 70, video content providers and so forth, and converts the obtained image data into data in a format for distribution as needed. The server device 50 transmits moving images requested by external devices, such as the electronic device 10, thereto by streaming or another method. In response to a request from the electronic device 10, the server device 50 may select data having an appropriate resolution from among a plurality of data prepared in multiple resolutions, and transmit the selected data to the electronic device 10. Alternatively, the server device 50 may be a simple relay server.

The imaging device 70 takes (shoots) a moving image (continuous image) with a set frame rate or takes consecutive still images (continuous image) at set intervals, thereby generating and outputting image data. The images that are taken by the imaging device 70 are not particularly limited, but may be color visible-light images. The imaging device 70 may be an imaging device (imager, camera) for commercial use, non-commercial use, personal use (e.g., to provide images to a specified/authorized person(s) only) or public use (e.g., to provide images to the public). In this embodiment, the imaging device 70 is for personal use to monitor the interior of a home of the user of the electronic device 10 and the terminal device 30.

The electronic device 10 is communicatively connected to the server device 50 and the terminal device 30 via a wireless LAN or the like, and the server device 50 is wire connected to the imaging device 70 via a LAN or the like. The imaging device 70 may be directly connected to the server device 50 as a peripheral device with a universal serial bus (UBS) cable, a high definition multimedia interface (HDMI®) cable or the like. The terminal device 30 may be directly communicatively connected to the electronic device 10 via short-range wireless communication, such as Bluetooth®.

Of these, at least the electronic device 10 and the imaging device 70 are included in the image processing system of this embodiment. In addition, the server device 50 may be included.

Figure 2A:
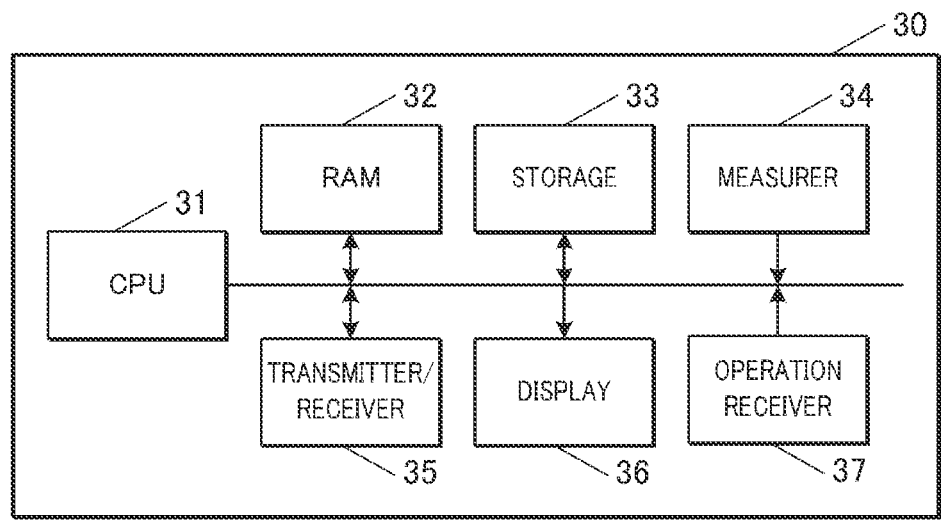
FIG. 2A is a block diagram showing a functional configuration of a terminal device.

FIG. 2A is a block diagram showing a functional configuration of the terminal device 30.

The terminal device 30 includes a central processing unit (CPU) 31, a random access memory (RAM) 32, a storage 33, a measurer 34, a data transmitter/receiver 35, a display 36, and an operation receiver 37.

The CPU 31 is a processor that performs arithmetic processing and overall control of the operation of the terminal device 30. The CPU 31 may be a single processor or a plurality of processors operating in parallel or independently depending on the program/process. The CPU 31 may be a low-performance CPU as compared with a CPU 11 of the electronic device 10, a CPU of the server device 50, or the like.

The RAM 32 provides a working memory space for the CPU 31 and stores temporary data. The RAM 32 is a DRAM, for example.

The storage 33 includes a nonvolatile memory, such as a flash memory, and stores programs, setting data and so forth. The programs include a program for moving image (video) display control. The setting data includes information on the resolution of the display 36 and the performance of the CPU 31 and information on communicative connection, such as information on pairing (bonding) relevant to Bluetooth communication.

The measurer 34 measures at least one of the following and outputs the measured data to the CPU 31. Those that may be measured by the measurer 34 include: biometric information on the wearer of the terminal device 30, such as pulse and SpO2; the movement/motion state of the terminal device 30, such as acceleration and geomagnetic field (azimuth); the environment around the terminal device 30, such as temperature and air pressure (altitude); and so forth.

The data transmitter/receiver 35 transmits and/or receives data to and/or from external devices. As described above, the data transmitter/receiver 35 controls wireless LAN communication, Bluetooth communication, and so forth.

The display 36 has a display screen, such as an LCD, and displays images under the control of the CPU 31. As described above, this display screen has a lower resolution than the display screen of the electronic device 10 or the like, and does not have capability sufficient to display a moving image(s) having a resolution and a frame rate that an ordinary PC, the electronic device 10 or the like displays.

The operation receiver 37 receives operations from the outside, for example, from the user, and outputs operation signals corresponding to the contents of the received operations to the CPU 31. The operation receiver 37 includes at least one of a pushbutton switch, a rotary switch, a touchscreen and the like. The touchscreen is overlaid on the display screen.

Figure 2B:
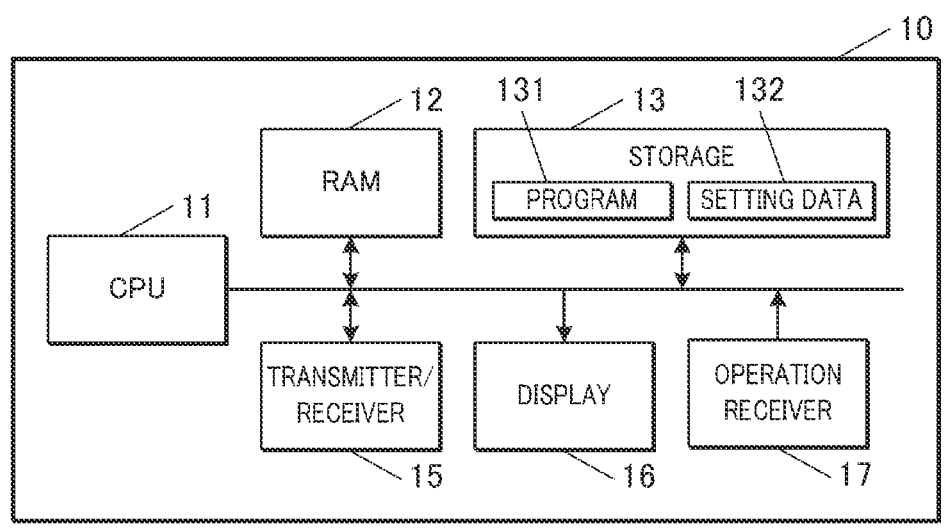
FIG. 2B is a block diagram showing a functional configuration of an electronic device.

FIG. 2B is a block diagram showing a functional configuration of the electronic device 10. The electronic device 10 includes a CPU 11 (controller), a RAM 12, a storage 13, a data transmitter/receiver 15, a display 16, and an operation receiver 17.

The CPU 11 is a processor that performs arithmetic processing and overall control of the operation of the electronic device 10. The CPU 11 may be a single processor or a plurality of processors operating in parallel or independently depending on the program/process.

The RAM 12 provides a working memory space for the CPU 11 and stores temporary data. The RAM 12 is a DRAM, for example.

The storage 13 includes a nonvolatile memory, such as a flash memory, and stores programs 131 and setting data 132. The programs 131 include a program for an image adjustment-and-output process, which is described later, relevant to processing of moving image (video) data that is received from the outside and displayed on the terminal device 30. The setting data 132 includes setting data for receiving moving image data from the server device 50 and setting data for processing the moving image data.

The data transmitter/receiver 15 transmits and/or receives data to and/or from external devices. As described above, the data transmitter/receiver 15 controls wireless LAN communication, Bluetooth communication, and so forth.

The display 16 has a display screen, such as an LCD, and displays images under the control of the CPU 11. The display 16 may include an LED lamp or the like for various types of notification. For example, the LED lamp is used to warn that the remaining amount of charge of a battery (e.g., rechargeable battery) is low, to indicate that the battery is being charged or has been fully charged, and to notify other events.

The operation receiver 17 receives operations from the outside, for example, from the user, and outputs operation signals corresponding to the contents of the received operations to the CPU 11. The operation receiver 17 includes at least one of a touchscreen, a pushbutton switch, a slide switch, a rocker switch and the like. The touchscreen is overlaid on the display screen.

The display 16 and the operation receiver 17 may be peripheral devices connected to connection terminals or the like of the electronic device 10.

Of the above, at least the CPU 11 and the RAM 12 are included in a computer of this embodiment.

Next, image processing in the electronic device 10 of this embodiment will be described.

The electronic device 10 performs a process for the terminal device 30 to display an image based on data (first data) of a continuous image (first image, e.g., moving image) received from the server device 50. This process is for the terminal device 30 to display, without difficulty, an image based on image data having a resolution and a frame rate that an ordinary PC, the electronic device 10 or the like displays.

Since the CPU 31 or the like of the terminal device 30 has a low image processing capability as described above, it is impractical for the terminal device 30 to convert the resolution, the frame rate or the like of image data. Further, if an object to be sighted (object or sighting target) is in an image, simple reduction of the resolution of the image may result in a resolution insufficient for the user to check the sighting target.

The electronic device 10 obtains information on the display performance (display capability) of the terminal device 30 (performance information of the display 36 of the terminal device 30), such as the resolution of the display 36, information on the communication speed between the electronic device 10 and the terminal device 30, information on the sighting target, and so forth, and sets an appropriate cutout size of an image on the basis of the information. The electronic device 10 generates partial images by cropping data of images (individual images) of a continuous image (e.g., frames of a moving image) so as to cut out, from each of the images, an area (portion) of the cutout size including the sighting target (ROI; Region of Interest), for example, using a clipping tool. The electronic device 10 may not reduce the resolution of the images of the continuous image to the resolution that is obtained if the images of the continuous image are cropped to the cutout size, but may reduce the resolution to a resolution higher than that. That is, the electronic device 10 may first crop data of images (individual images) so as to cut out, from each of the images, an area having a size the number of pixels of which is larger than the number of pixels of the display screen of the terminal device 30, and then scale down the cropped images to fit the resolution of the display screen of the terminal device 30. If the frame rate is reduced, the electronic device 10 may delete data of some frames as appropriate. Further, depending on the necessity, the image processing capability of the electronic device 10, the response speed of the display screen of the display 36, or the like, the electronic device 10 may generate image data by linear interpolation of the sighting target in one image data and next image dada. The electronic device 10 transmits/outputs data (second data) of a continuous image (second image) of the partial images thus generated to the terminal device 30. The terminal device 30 therefore can display, without difficulty, an image based on image data received through the data transmitter/receiver 35.

Figure 3A:
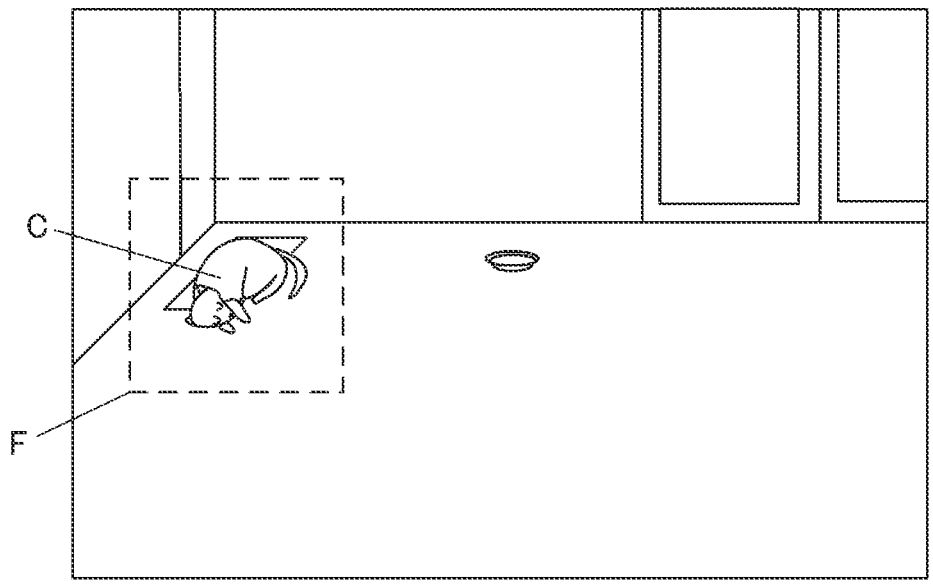
FIG. 3A shows an example of cropping of image data.
Figure 3B:
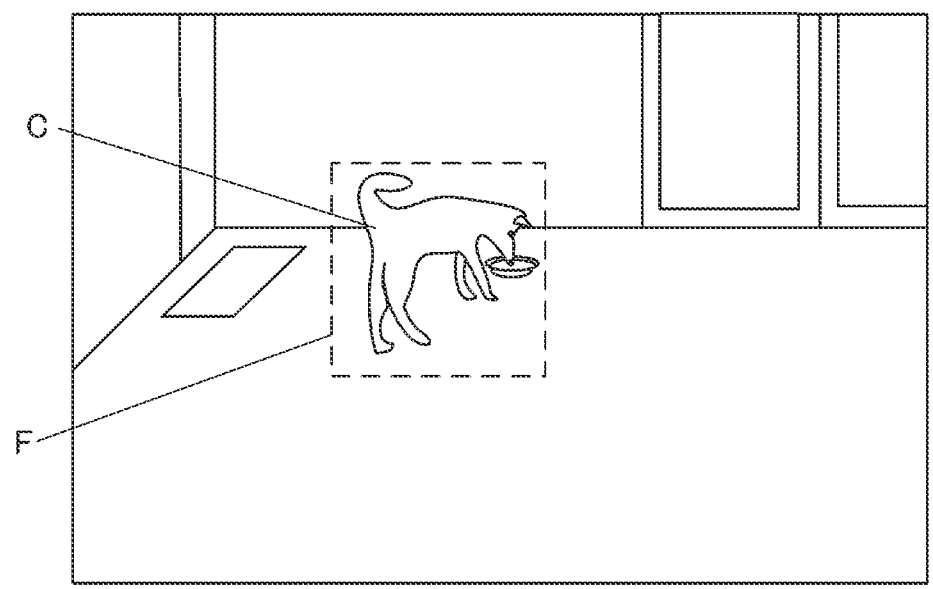
FIG. 3B shows an example of cropping of image data.

FIG. 3A and FIG. 3B show examples of cropping of image data.

For example, if a sighting target C in an image taken by the imaging device 70 that photographs a room (living room, etc.) of the user' home is a pet animal in the room, the image is cropped such that an area including the pet animal is cut out as indicated by a dashed line F in each of FIG. 3A and FIG. 3B. As shown in FIG. 3A and FIG. 3B, since this pet animal can change its posture and move, the area to be cut out from an image (individual image) (position of the dashed line F) may change from image to image. The sighting target C is identified by a well-known image recognition process. For example, the image recognition process may be simple contour detection. Alternatively, the image recognition process may be a process using a trained machine learning model (trained model) that extracts a learned object from each input image to output an area including the object. Still alternatively, if the background, namely, everything in the room except the sighting target C, does not change, for example, from when the user of the terminal device 30 leaves the room until the user comes back to the room, difference between the sighting target C and the background may be used to detect/identify the sighting target C, and if something moving appears in an image (individual image), their sizes detected may be used to detect/identify the sighting target C.

If the sighting target C is too close to the imaging device 70 to fit in the cutout size, to which images (individual images) are cropped, partial images having the cutout size may be generated by cropping each image concerned so as to cut out an area wider than the cutout size (i.e., by cutting out a portion from each image cornered on the basis of the cutout size) and then scaling down the cropped image to reduce the resolution. If the sighting target C is not included (present) in an image (individual image), the image may be deleted if possible. If the image cannot or should not be deleted because it is a key frame or the like, the image may be treated as being identical with an image that has been cropped most recently or may be kept as it is without the sighting target C. Change in everything except the sighting target C may be omitted as appropriate (e.g., does not need to be taken into account to determine the area to be cut out).

Figure 4:
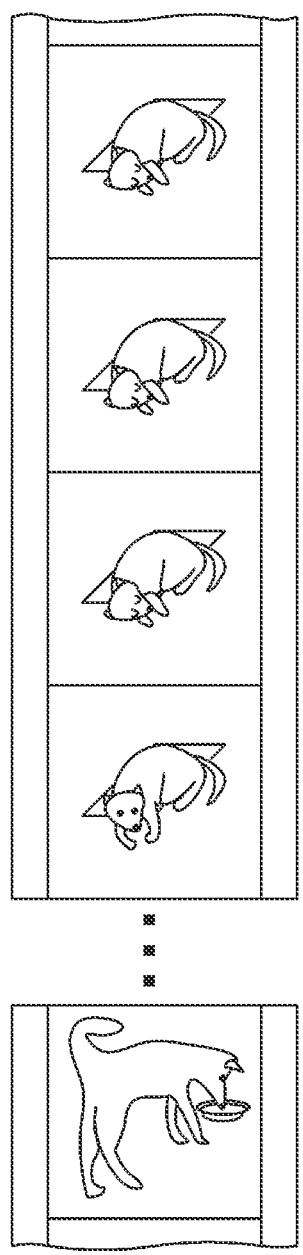
FIG. 4 shows an example of a moving image to be output.

FIG. 4 shows an example of a moving image to be output.

Images (of consecutive still images or frames of a moving image) cropped to an appropriate size as described above are transmitted to the terminal device 30. If the images are of a moving image, they are transmitted to the terminal device 30 while being brought back to moving image date in a unit number of frames (segment or group of picture (GOP)), whereas if the images are of consecutive still images, they each are transmitted to the terminal device 30 with an appropriate delay time (required time from reception to transmission of each image). The terminal device 30 merely displays the received images on the display screen (or after decoding if they are of a moving image). Hence, the processing load of the terminal device 30 is kept to a minimum required for image display, and does not become heavy. This allows the user to see/watch a moving image or consecutive still images to sight the sighting target C therein with less stress.

Figure 5:
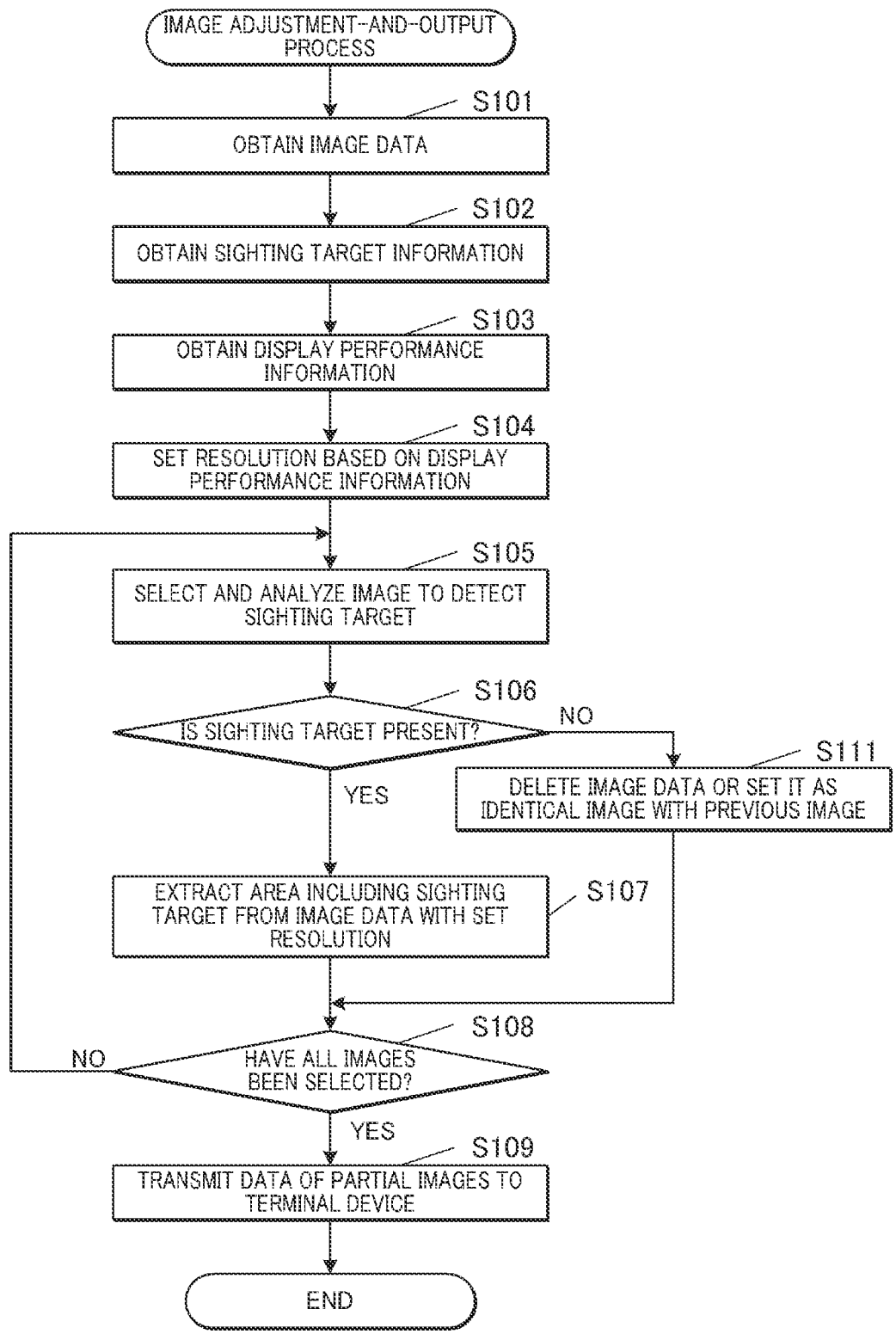
FIG. 5 is a flowchart showing a control procedure of an image adjustment-and-output process that is performed by the electronic device.

FIG. 5 is a flowchart showing a control procedure of the image adjustment-and-output process that is performed by the CPU 11 of the electronic device 10 of this embodiment. This image adjustment-and-output process as an image processing method of this embodiment is performed by the electronic device 10 in a state of having received an image transmission request from the terminal device 30. The electronic device 10 in this state performs the image adjustment-and-output process each time the electronic device 10 receives image data (segment data in the case of a moving image) to be displayed on the terminal device 30, or when-ever the electronic device 10 has unprocessed received image data if the electronic device 10 receives image data before finishing the process on the previously received image data.

The CPU 11 obtains received image data (Step S101). The CPU 11 obtains information on the sighting target to extract (cut out) from each image (Step S102). This information may be obtained from the terminal device 30 and/or set in the electronic device 10 in advance. The CPU 11 obtains display performance information (performance information) of the terminal device 30 transmitted and received from the terminal device 30 together with the image transmission request (Step S103). It is preferable that this information be not estimated information but accurate information, in particular, directly obtained from the terminal device 30. The display performance information includes the resolution (including aspect ratio), screen size and response speed of the terminal device 30. The display performance information may further include the refresh rate, luminance and contrast ratio of the terminal device 30. The CPU 11 sets an appropriate image output size (resolution, frame rate, compression ratio, etc.) on the basis of the obtained display performance information (Step S104).

The CPU 11 selects and analyzes an image to detect the sighting target, which is the extraction target, in the image (Step S105). In the case of a still image, the CPU 11 analyzes the image as it is, whereas in the case of a moving image, the CPU 11 first decodes and then analyzes the image in order from the top. The CPU 11 determines whether the extraction target is present (has been detected) in the image (individual image) (Step S106). If the CPU 11 determines that the extraction target is present in the image (Step S106; YES), the CPU 11 performs cropping to extract an area (portion) including the extraction target from the image with a resolution corresponding to the resolution included in the obtained display performance information (Step S107). If an area wider than a size (cutout size) suitable for the set resolution needs to be extracted as described above, the CPU 11 performs the abovementioned process or the like to reduce the resolution after the cropping. In Step S107, the CPU 11 may also performs a process(es) to change the luminance, the contrast and/or the like to those suitable for display on the terminal device 30. Then, the image adjustment-and-output process by the CPU 11 proceeds to Step S108.

If the CPU 11 determines in Step S106 that the extraction target is not present in the image (Step S106; NO), in the case where the image is a still image or the like, the CPU 11 simply deletes the image data of the image and accordingly excludes it from data to transmit to the terminal device 30, whereas in the case where the image is one of frames of a moving image, the CPU 11 sets this image as an identical image with the most recent image in which the extraction target is present (Step S111). If the number of frames is changed, the CPU 11 excludes such an individual image prior to the others. Then, the image adjustment-and-output process by the CPU 11 proceeds to Step S108.

In Step S108, the CPU 11 determines whether all the images (or the one image in the case of a still image) have been selected from the obtained image data (Step S108). If the CPU 11 determines that not all the images have been selected yet (there is an image(s) not selected yet) (Step S108; NO), the image adjustment-and-output process by the CPU 11 returns to Step S105.

If the CPU 11 determines that all the images have been selected (Step S108; YES), the CPU 11 re-encodes the cropped images (partial images) as moving image data as needed and transmits same to the terminal device 30 (Step S109). In Step S109, if possible, the CPU 11 may adjust the degree of encoding (degree of compression) referring to the processing capability (decoding-and-displaying capability) of the terminal device 30 and the communication speed between the electronic device 10 and the terminal device 30. That is, if the processing capability of the terminal device 30 is insufficient, the CPU 11 may reduce the degree of compression although the data amount that the CPU 11 transmits increases, in order to reduce the decoding load of the terminal device 30. Then, the CPU 11 ends the image adjustment-and-output process.

As described above, the electronic device 10 as the image processing device of this embodiment includes the data transmitter/receiver 15 and the CPU 11. The CPU 11 obtains first data of a continuous first image (moving image data, etc.), obtains performance information of the display 36 of the terminal device 30 that displays a second image based on the first image, generates, from the first data, second data in accordance with the performance information, and outputs the second data to the terminal device 30 through the data transmitter/receiver 15.

Thus, the electronic device 10 obtains the display performance of the terminal device 30, generates image data that matches the display performance of the terminal device 30, and transmits the image data to the terminal device 30. This reduces the image processing load of the powerless terminal device 30 and enables the terminal device 30 to perform only the minimum processing (e.g., decoding) for display. The terminal device 30 therefore can display a moving image(s).

Further, the CPU 11 sets a cutout size based on the performance information to cut out partial images from respective individual images of the first image, and generates the second image including the partial images of areas cut out from the respective individual images, the areas each having the cutout size and including the sighting target (object).

The electronic device 10 does not simply change (reduce) the overall resolution of the first image to the resolution of the terminal device 30, but reduces the total number of pixels of the first image while minimizing reduction of the resolution of the sighting target by obtaining information on the sighting target, detecting the sighting target in each individual image, and cropping each individual image so as to include the detected sighting target. Hence, even if the display screen of the terminal device 30 is significantly smaller than the display screen of an ordinary PC or the like, the user can readily see at least necessary information with a necessary resolution. In particular, when the user does not need to watch the whole image(s) closely, but wants to give a quick look at a portion in the image(s) to check the condition/state of the sighting target, the user can readily check it on the small display screen of the terminal device 30. Thus, user convenience is improved.

Further, the CPU 11 analyzes the individual images of the continuous first image to identify the sighting target in the individual images. In the case where the sighting target moves around and does not stay at a specific position in images (individual images), the CPU 11 performs the process to identify the sighting target in each individual image data, and changes the cropping position, the cutout size or the like, which is relevant to generation of partial images, in accordance with the position or area where the sighting target has been identified. Thus, the CPU 11 can include the necessary content in the partial images while minimizing reduction of the imaged size of the sighting target.

The CPU 11 may delete an individual image(s) of the continuous first image (e.g., moving image) in response to the individual image(s) not including the sighting target. Except for such cases where an image (individual image) cannot or should not be deleted because it is a key frame or the like or where the number of frames cannot be reduced, it is unnecessary to cause the terminal device 30 to display an image(s) in which the sighting target is not present and increase the load of the terminal device 30 accordingly. Hence, the CPU 11 takes away (subtracts/deletes) such an image(s). This reduces the load of the terminal device 30 relevant to moving-image display and enables the terminal device 30 to display a moving image(s) of partial images more certainly.

Further, the performance information, which is relevant to display on the display device 30, includes the resolution of the display 36. Hence, the electronic device 10 can first process image data in accordance with the resolution of the terminal device 30 and then output the image data to the terminal device 30. This makes image processing in the terminal device 30 very easy, reduces the load of the terminal device 30, and enables the terminal device 30 to display a moving image(s) more certainly by the reduction of the load.

Further, the CPU 11 obtains the performance information of the terminal device 30 from the terminal device 30 through the data transmitter/receiver 15. Since the electronic device 10 obtains such reliable information directly from the terminal device 30, estimation of the performance information is unneeded, and no wrong estimation is made accordingly. Hence, the electronic device 10 can certainly generate optimal image data for the terminal device 30.

Further, the terminal device 30 is a wearable terminal device. That is, the user can look at the displayed image on the terminal device 30 without holding the terminal device 30 in his/her hand, and even if he/she always wears the terminal device 30, problems are unlikely to arise. Hence, the terminal device 30 can be effectively used, for example, for a quick check on an image (i.e., sighting target) in user's spare time or the like.

The CPU 11 may obtain the first data of the continuous first image from the server device 50 through the data transmitter/receiver 15. This data is not limited to data obtained directly from the imaging device 70 in approximately real time. Further, the continuous image data may be data edited or created and then transmitted from a distribution server, a private PC or the like as far as the content is free of copyright-related restrictions (e.g., encryption) or other factors that prevent image processing in the electronic device 10.

The video display system 100, which includes the image processing system of this embodiment, includes the electronic device 10 and the imaging device 70 that performs imaging and generates the first data of the continuous first image. The electronic device 10 outputs the continuous image taken by the imaging device 70 to the terminal device 30 after obtaining the accurate display performance of the terminal device 30. The video display system 100 thus allows the user to more readily check on a continuous image(s) on the terminal device 30. In particular, since the electronic device 10 adjusts a private video(s) or the like in accordance with the display performance of the terminal device 30, the user does not need to go through the trouble to perform settings of image processing or the like.

The image adjustment-and-output process as the image processing method of this embodiment is performed outside the terminal device 30, and includes obtaining first data of a continuous first image, obtaining performance information of the display 36 of the terminal device 30 that displays a second image based on the first image, generating, from the first data, second data in accordance with the performance information, and outputting the second data of the second image to the terminal device 30 through the data transmitter/receiver 15.

In this image processing method, the display performance of the external device (terminal device 30) that displays a continuous image (second image) is obtained, and second data of the second image that matches the display performance is generated. Thus, the process to reduce the size (in terms of data amount) of a continuous image to a level/size suitable for the display 36 can be performed outside the terminal device 30. The terminal device 30 therefore does not need to perform much image processing all over again, but just decodes the obtained second data of the continuous second image, and drives the display 36 to display the image (second image) based on the second data. Thus, the image processing method can significantly reduce the processing load of the terminal device 30.

Installation and execution of the program for the image processing method into and by the electronic device 10 eliminates the necessity for the user to perform settings of image processing or the like suitable for the terminal device 30, and easily enables the terminal device 30 to display a continuous image(s). The above also reduces setting operations and processes to be made and performed on the terminal device 30, and accordingly saves the user the trouble to make operations.

The terminal device 30 as the display device of this embodiment includes the data transmitter/receiver 35, the display 36 and the CPU 31. The CPU 31 transmits information on display performance of the terminal device 30 to the electronic device 10 through the data transmitter/receiver 35, receives, from the electronic device 10, continuous display image data for the display performance through the data transmitter/receiver 35, and causes the display 36 to display a continuous image corresponding to the display image data.

The terminal device 30 transmits the information on the display performance of itself to the electronic device 10, and, as a result, can obtain a continuous image for the display performance, and display the content desired by the user with a lower load than ever before.

The present disclosure is not limited to the above embodiment, but can be appropriately changed in a variety of respects. For example, in the above embodiment, the server device 50 that obtains image data from the imaging device 70 distributes the image data to the electronic device 10, but the present disclosure is not limited thereto. For example, the electronic device 10 may obtain image data directly from the imaging device 70. Alternatively, the imaging device 70 itself may operate as the electronic device 10, namely, obtain the display performance information of the terminal device 30, adjust images of a continuous image accordingly, and output partial images thereof to the terminal device 30. Further, instead of obtaining image data directly from the imaging device 70, the server device 50 may obtain image data processed/edited by another computer. Further, the continuous image(s) is not limited to the one taken by the imaging device 70, but may be a computer graphics (CG) image, an animation image or the like.

Further, in the above embodiment, the sighting target is an indoor pet animal, but not limited thereto. For example, the sighting target may be a pet tropical fish in a fish tank. The technique of the present disclosure may be used for observation of those other than pet animals, for example, for observation of a nest or a feeding area of a wild bird(s) or for watching of an infant or an elderly person. Further, the technique of the present disclosure may be used for sighting of those other than organisms, for example, for sighting of the operational state of a device (non-IoT home appliance, etc.) or for sighting of the state of a substance/thing (observation of snow or ice, monitoring of laundry, etc.). Further, the sighting target may not even be a substance/thing, but may be incidence of sunlight into a room, blowing of a rain shower into a room, or the like. Further, the technique of the present disclosure may be used for confirmation of a procedure, such as a recipe, of a task, such as cooking, the procedure being difficult to confirm using a hand during the task.

Further, in the above embodiment, the data that is handled in the video display system 100 is image data only, but not limited thereto. The data may be image data provided with audio data, or image data obtained by deleting audio data from data originally composed of image data and audio data.

Further, in the above embodiment, the number of sighting targets is one, but may be two or more. In such a case, each (individual) image may be cut (cropped) so as to include all the sighting targets. Alternatively, the sighting targets may be changed in order every certain period of time, or one sighting target may be replaced by another sighing target when an event, such as a movement, corresponding to this another sighting target occurs. That is, there may be one sighting target at a time.

Further, in the above embodiment, the sighting target is detected/identified in each individual image, and the cutout area for the sighting target is set in each individual image. However, if the sighting target does not move, the cutout area may be fixed in advance, and the sighting target may not be identified. Alternatively, the sighting target may be identified at certain intervals (e.g., once a day) only, and when it is found that the position of the sighting target in an image (individual image) has changed from the one in a previous image, the position of the cutout area may be adjusted.

Further, if no sighting target is specified, or the sighting target occupies the entire screen (of the imaging device 70), images (individual images) may not be cropped.

Further, in the above embodiment, the terminal device 30 is a wearable terminal device, but not limited thereto. For example, the terminal device 30 may be another small portable device or a small desktop device that can be placed to stand on a desk (lean against something, hang on a partition, etc.) such that the user can look at an image displayed thereon.

Further, as far as the terminal device 30 is the one for which, in terms of its display performance, changing/processing original image data outside is useful, it does not matter how low the display performance of the terminal device 30 is.

Further, image processing itself may not be performed by the one electronic device 10, but divided between two or more electronic devices. Further, the electronic device 10 that has obtained the display performance information of the terminal device 30 and the sighting target information may request another processing device to handle a request when the electronic device 10 receives the request from the terminal device 30.

Further, in the above, the computer-readable storage medium storing the program(s) 131 for controlling image processing (e.g., image adjustment-and-output process) of the present disclosure is the storage 13 including a nonvolatile memory, such as a flash memory, but not limited thereto and may be another nonvolatile memory, such as an MRAM, or a portable recording medium, such as a CD-ROM or a DVD. Further, as a medium to provide data of the program(s) of the present disclosure via a communication line, a carrier wave can be used.

The specific configurations/components, contents and procedures of the processes and so forth described in the above embodiment can be appropriately changed without departing from the scope of the present disclosure.

Although one or more embodiments of the present disclosure have been described above, the scope of the present disclosure is not limited to the embodiments described above, but includes the scope of claims stated below and their equivalents.

The invention claimed is:

1. An image processing device comprising:
a data transmitter/receiver; and
at least one processor that
obtains first data of a continuous first image,
obtains performance information of a display of a first external device that displays a second image based on the first image,
sets a cutout size based on the performance information to cut out a partial image from each individual image of the first image,
cuts out, as the partial image, a portion including an object from the individual image based on the cutout size and generates the second image including the partial image of the cutout size,
analyzes the individual image to identify the object in the individual image,
deletes the individual image in response to the individual image not including the object,
generates, from the first data, second data of the second image in accordance with the performance information, and
outputs the second data to the first external device through the data transmitter/receiver.

2. The image processing device according to claim 1, wherein the performance information includes a resolution of the display.

3. The image processing device according to claim 1, wherein the processor obtains the performance information of the first external device from the first external device through the data transmitter/receiver.

4. The image processing device according to claim 1, wherein the first external device is a wearable terminal device.

5. The image processing device according to claim 1, wherein the processor obtains the first data from a second external device through the data transmitter/receiver.

6. An image processing system comprising:
the image processing device according to claim 1; and
a camera that performs imaging and generates the first data of the continuous first image.

7. An image processing method that is performed by a computer, comprising:
obtaining first data of a continuous first image;
obtaining performance information of a display of a first external device that displays a second image based on the first image;
setting a cutout size based on the performance information to cut out a partial image from each individual image of the first image,
analyzing the individual image to identify the object in the individual image, deleting the individual image in response to the individual image not including the object, generating, from the first data, second data of the second image in accordance with the performance information, wherein the generating includes cutting out, as the partial image, a portion including an object from the individual image based on the cutout size and generating the second image including the partial image of the cutout size; and outputting the second data to the first external device through a data transmitter/receiver.

8. The image processing method according to claim 7, wherein the performance information includes a resolution of the display.

9. The image processing method according to claim 7, wherein the obtaining of the performance information includes obtaining the performance information of the first external device from the first external device through the data transmitter/receiver.

10. The image processing method according to claim 7, wherein the first external device is a wearable terminal device.

11. The image processing method according to claim 7, wherein the obtaining of the first data includes obtaining the first data from a second external device through the data transmitter/receiver.

12. A non-transitory computer-readable storage medium storing a program that causes a computer to:

obtain first data of a continuous first image;

obtain performance information of a display of a first external device that displays a second image based on the first image;

set a cutout size based on the performance information to cut out a partial image from each individual image of the first image, cut out, as the partial image, a portion including an object from the individual image based on the cutout size and generate the second image including the partial image of the cutout size, analyze the individual image to identify the object in the individual image, delete the individual image in response to the individual image not including the object, generate, from the first data, second data of the second image in accordance with the performance information; and output the second data to the first external device through a data transmitter/receiver.

* * * * *